(12) United States Patent
Foulger et al.

(10) Patent No.: US 7,386,594 B2
(45) Date of Patent: *Jun. 10, 2008

(54) SYSTEM AND METHOD RELATED TO GENERATING AN EMAIL CAMPAIGN

(75) Inventors: Michael G. Foulger, Novato, CA (US); Thomas R. Chipperfield, Petaluma, CA (US); Jeremy S. Cooper, Petaluma, CA (US); Andrew C. Storms, Petaluma, CA (US)

(73) Assignee: Archeron Limited LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/452,431

(22) Filed: Jun. 14, 2006

(65) Prior Publication Data
US 2007/0022170 A1     Jan. 25, 2007

Related U.S. Application Data

(63) Continuation of application No. 09/841,186, filed on Apr. 25, 2001, now Pat. No. 7,065,555.

(60) Provisional application No. 60/199,355, filed on Apr. 25, 2000.

(51) Int. Cl.
*G06F 15/16* (2006.01)
(52) U.S. Cl. .............. 709/206; 709/201; 709/203
(58) Field of Classification Search ........ 709/201–203, 709/206–207, 223–225
See application file for complete search history.

(56) References Cited

U.S. PATENT DOCUMENTS

| 5,164,897 A | 11/1992 | Clark et al. |
| 5,265,033 A | 11/1993 | Vajk et al. |
| 5,583,995 A | 12/1996 | Gardner et al. |

(Continued)

FOREIGN PATENT DOCUMENTS

| EP | 0989501 A2 | 9/1999 |

(Continued)

OTHER PUBLICATIONS

Anderson, D., "E-mail or Me-Mail?" The Industry Standard, IDG.net, printed from .thestandard/com/article/display/0,1151,12422,00.html, 4 pages (Mar. 6, 2000).

(Continued)

*Primary Examiner*—Bharat Barot
(74) *Attorney, Agent, or Firm*—Sterne Kessler Goldstein & Fox PLLC

(57) ABSTRACT

A method and system for generating an email campaign is described. An email campaign generator generates an email campaign template from an email target database. The email target database comprises at least one email target. An email campaign engine generates a custom email corresponding to each of the at least one email target. The custom email is formed from the email campaign template. The email campaign engine sends to each of the at least one email target the corresponding custom email. A campaign tracker receives at least one response corresponding to the sent custom email. The campaign tracker creates a campaign tracking list that includes the received at least one response.

15 Claims, 14 Drawing Sheets

U.S. PATENT DOCUMENTS

| | | | |
|---|---|---|---|
| 5,793,972 | A | 8/1998 | Shane |
| 5,818,447 | A | 10/1998 | Wolf et al. |
| 5,870,552 | A | 2/1999 | Dozier et al. |
| 5,933,811 | A | 8/1999 | Angles et al. |
| 5,937,162 | A | 8/1999 | Funk et al. |
| 5,966,695 | A | 10/1999 | Melchione et al. |
| 5,978,799 | A | 11/1999 | Hirsch |
| 5,999,912 | A | 12/1999 | Wodarz et al. |
| 6,055,510 | A | 4/2000 | Henrick et al. |
| 6,091,777 | A | 7/2000 | Guetz et al. |
| 6,094,507 | A | 7/2000 | Monden |
| 6,101,485 | A | 8/2000 | Fortenberry et al. |
| 6,170,011 | B1 | 1/2001 | Beck et al. |
| 6,188,398 | B1 | 2/2001 | Collins-Rector et al. |
| 6,222,825 | B1 | 4/2001 | Mangin et al. |
| 6,233,520 | B1 | 5/2001 | Ito et al. |
| 6,263,020 | B1 | 7/2001 | Gardos et al. |
| 6,275,575 | B1 | 8/2001 | Wu |
| 6,282,540 | B1 | 8/2001 | Goldensher et al. |
| 6,321,265 | B1 | 11/2001 | Najork et al. |
| 6,346,980 | B1 | 2/2002 | Tani et al. |
| 6,351,755 | B1 | 2/2002 | Najork et al. |
| 6,360,254 | B1 | 3/2002 | Linden et al. |
| 6,377,936 | B1 | 4/2002 | Henrick et al. |
| 6,397,219 | B2 | 5/2002 | Mills |
| 6,401,075 | B1 | 6/2002 | Mason et al. |
| 6,449,635 | B1 | 9/2002 | Tilden et al. |
| 6,462,676 | B1 | 10/2002 | Koizumi |
| 6,466,940 | B1 | 10/2002 | Mills |
| 6,523,021 | B1 | 2/2003 | Monberg et al. |
| 6,539,080 | B1 | 3/2003 | Bruce et al. |
| 6,549,950 | B2 | 4/2003 | Lytle et al. |
| 6,560,243 | B1 | 5/2003 | Mogul |
| 6,578,022 | B1 | 6/2003 | Foulger et al. |
| 6,587,832 | B1 | 7/2003 | Beck et al. |
| 6,594,666 | B1 | 7/2003 | Biswas et al. |
| 6,618,747 | B1 | 9/2003 | Flynn et al. |
| 6,657,558 | B2 | 12/2003 | Horita et al. |
| 6,662,194 | B1 | 12/2003 | Joao |
| 6,668,281 | B1 | 12/2003 | Ayyadurai |
| 6,681,255 | B1 | 1/2004 | Cooper et al. |
| 6,694,353 | B2 | 2/2004 | Sommerer |
| 6,721,784 | B1 | 4/2004 | Leonard et al. |
| 6,751,606 | B1 | 6/2004 | Fries et al. |
| 6,791,943 | B1 | 9/2004 | Reynolds |
| 6,829,780 | B2 | 12/2004 | Kraft et al. |
| 6,854,007 | B1 | 2/2005 | Hammond |
| 7,007,010 | B2 | 2/2006 | Cooper |
| 7,065,555 | B2 * | 6/2006 | Foulger et al. ............. 709/206 |
| 2001/0011226 | A1 | 8/2001 | Greer et al. |
| 2001/0039508 | A1 | 11/2001 | Nagler et al. |
| 2001/0042000 | A1 | 11/2001 | Defoor, Jr. |
| 2001/0047297 | A1 | 11/2001 | Wen |
| 2001/0054043 | A1 | 12/2001 | Harlan |
| 2002/0004733 | A1 | 1/2002 | Addante |
| 2002/0004753 | A1 | 1/2002 | Perkowski |
| 2002/0016730 | A1 | 2/2002 | Foulger et al. |
| 2002/0016809 | A1 | 2/2002 | Foulger et al. |
| 2002/0073343 | A1 | 6/2002 | Ziskind et al. |
| 2002/0082923 | A1 | 6/2002 | Merriman et al. |
| 2002/0103698 | A1 | 8/2002 | Cantrell |
| 2002/0147637 | A1 | 10/2002 | Kraft et al. |
| 2002/0152238 | A1 | 10/2002 | Hayes |
| 2002/0156779 | A1 | 10/2002 | Elliott et al. |
| 2003/0037158 | A1 | 2/2003 | Yano et al. |
| 2003/0046148 | A1 | 3/2003 | Rizzi et al. |
| 2003/0128297 | A1 | 7/2003 | Chu |
| 2003/0145100 | A1 | 7/2003 | Marchetto et al. |
| 2003/0229638 | A1 | 12/2003 | Carpenter et al. |
| 2004/0010484 | A1 | 1/2004 | Foulger et al. |
| 2004/0210589 | A1 | 10/2004 | Cooper et al. |
| 2004/0220821 | A1 | 11/2004 | Ericcson et al. |
| 2005/0171863 | A1 | 8/2005 | Hagen |
| 2005/0289005 | A1 | 12/2005 | Ferber et al. |
| 2006/0085263 | A1 | 4/2006 | Greer et al. |
| 2006/0129536 | A1 | 6/2006 | Foulger et al. |
| 2007/0016562 | A1 | 1/2007 | Cooper |
| 2007/0022170 | A1 | 1/2007 | Foulger et al. |
| 2007/0150804 | A1 | 6/2007 | Foulger et al. |
| 2007/0204219 | A1 | 8/2007 | Foulger et al. |

FOREIGN PATENT DOCUMENTS

| | | |
|---|---|---|
| JP | 08221479 A | 8/1996 |
| WO | WO 97/07467 | 2/1997 |
| WO | PCT/US97/19719 A2 | 10/1997 |
| WO | WO 98/20434 | 5/1998 |
| WO | PCT/US97/22151 | 6/1998 |
| WO | WO 00/20975 | 4/2000 |
| WO | WO 00/20975 A1 | 4/2000 |
| WO | WO 01/13069 A1 | 2/2001 |
| WO | WO 01/65426 A1 | 9/2001 |

OTHER PUBLICATIONS

Cross, R. and Nassef, A., "E-Mail Direct Markieting Comes of Age," Direct Marketing, Hoke Communications, vol. 62, No. 6, pp. 44-45 (Oct. 1999).

"Top Ten Strategies for Direct Email Success," Boldfish Corporation, Printed from .boldfish.com/BF-emguide/top-ten.html, 7 pages (Jan. 1, 2000).

English-language Abstract of Japanese Patent Publication No. 2000020421, European Patent Office, 1 page (Jan. 21, 2000—Date of publication of application).

International Search Report from PCT Application No. PCT/US01/13137, 7 pages, mailed Aug. 28, 2002.

"What is MD5 and Why Do I Care?" by Lance Spitzner enteract.com/~/spitz/md5.html downloaded Mar. 20, 2000.

The MD5 Message Digest Algorithm by R.Rivest MIT Laboratory for Computer Science and RSA Data Security, Inc. Apr. 1992.

Applied Cryptography Protocols, Algorithms, and Source Code Inc. Schier, Bruce 1996.

Google Launches Full Suite of Fully Automated, Highly Customizable Websearch Services Based on Company's Award-Winning Search Technology Business Wire, p. 0420 Apr. 4, 2000.

RSS Feeds From CNET News.com/CNET News.com /news.com/2009-1090-980549.html!tag=ne.404 (downloaded May 15, 2006- 3 pgs).

.weather.com.services/oap.html?from=servicesindex downloaded May 18, 2006.

Gauch, S. and Smith, John. "Query Reformulation Strategies for an Intelligent Search Intermediary" Proceedings of the AI Systems in Government Conference, IEEE Computer Society ISBN No. 0-8186-1934-1 pp. 65-71 (Mar. 27-31, 1989).

Hsiangchu, Lai et al. A System Architecture of Intelligent-Guided Browsing on the Web, 1998, IEEE, 1060-3425, 1-10.

Jin-gang Kim et al., Intelligent Information Recommmend System on the Internet, 1999, IEEE.

Branscum, Deborah "Sites to Help Professional Workers Who Like to Go it Alone", New York Times, Oct. 14, 1999, retrieved Jun. 23, 2005 from Proquest Direct, pp. 1-3.

Houston, Lori, "IC Planet: Running Perl in the Engine", oreilly.com Apr. 10, 2000 [retrieved May 23, 2005 from Google.com p. 1-2].

Clark, Don "E-Business Starting Gate" Wall Street Journal Apr. 24, 2000 [retrieved Jun. 23, 2005 from Proquest Direct p. 1-3].

IBM Technical Disclosure Bulletin, NN8905154, May 1989 2 pgs.

International Search report for Application No. PCT/US01 12648 Nov. 21, 2001, 6 pgs.

International Search Report from Application No. PCT/US01/13141, 7 pages, mailed Oct. 27, 2003.

Sanad et al. Mobile cellular/GPS/satellite antennas with both single - band and dual-band, Antennas and Propagation Society International Symposium, Jul. 16-20, 2000. cited by examiner.

Nagy et al. Geographic Data Processing. ACM Computing Surveys. 1979, p. 139-181. cited by examiner.

International Search report for Application No. PCT/US01 12510 Apr. 18, 2001, 6 pgs mailed Sep. 5, 2002.

Ju, J and Wang Y., "Scheduling PVM Tasks," XP000627434, Operating Systems Review (SIGOPS), ACM Headquarter, New York, NY, vol. 30, No. 3, Jul. 1, 1996, pp. 22-31.

"Mental Ray Specification," XP002195542, .id8media.com/3s_products/mental_ray2.htm>,[internet], retrieved on Apr. 8, 2002.

Taylor, A., "Press Release—Avid Announces New Release of softimage/3d 3.8sp2," XP002195543, <.softimage.com/community/xsi/discuss/Archives/3dgames.archive.9907/msg0000.htm>, [internet], retrieved on Apr. 8, 2002.

Ganesh, Sathy, Google Groups, "Re: Group Scheduling Software for PC's and mac's", Sep. 22, 1994, Newsgroups: bit.listserv.novell.

Foulger, Michael G., et al. U.S. Appl. No. 09/551,746, filed Apr. 18, 2000 entitled "Method, System, and Computer Program Product for Propagating Remotely Configurable Posters of Host Site Content".

* cited by examiner

INTRANET HOME
EMAIL STATISTICS HOME

FIG. 8A

EMAIL CAMPAIGN HISTORY 800

| CAMPAIGN 802 | HITS 804 | SUBJECT 806 | DATE GENERATED 808 | MESSAGE TEXT 812 | DEMOGRAPHICS 814 |
|---|---|---|---|---|---|
| 31 1 *(816)* | 4.56% | WE FOUND YOUR RESUME (W/NAME) Pt. 2 | 2000-03-03 17:05:00 | ICSolicitation031.01.txt | CHART |
| 31 11 | 2.10% | WE FOUND YOUR RESUME (FOLLOW-UP TO 31.1) | 2000-03-14 13:46:00 | ICSolicitation031.011.txt | CHART |
| 30 1 | 20.00% | WE FOUND YOUR RESUME (W/NAME) pt. 1 | 2000-03-03 16:13:00 | ICSolicitation030.01.txt | CHART |
| 29 1 | 24.00% | WE FOUND YOUR RESUME (W/NAME) | 2000-02-14 16:31:00 | ICSolicitation029.01.txt | CHART |
| 29 11 | 2.56% | WE FOUND YOUR RESUME (W/NAME: FOLLOW-UP #1 TO 29.1) | 2000-02-23 16:02:00 | ICSolicitation029.011.txt | CHART |
| 28 1 | 14.00% | WE FOUND YOUR RESUME | 2000-01-28 18:25:00 | ICSolicitation028.01.txt | CHART |
| 28 11 | 16.09% | WE FOUND YOUR RESUME (FOLLOW-UP #1 TO 28.1) | 2000-02-04 18:55:00 | ICSolicitation028.011.txt | CHART |
| 27 1 | 17.00% | WE FOUND YOUR RESUME | 2000-01-25 19:39:00 | ICSolicitation027.01.txt | CHART |
| 27 2 | 14.00% | WE FOUND YOUR RESUME | 2000-01-28 18:22:00 | ICSolicitation027.02.txt | CHART |
| 27 11 | 11.90% | WE FOUND YOUR RESUME (FOLLOW-UP #1 TO 27.1) | 2000-02-04 18:54:00 | ICSolicitation027.011.txt | CHART |
| 27 21 | 9.20% | WE FOUND YOUR RESUME (FOLLOW-UP #1 TO 27.2) | 2000-02-04 18:55:00 | ICSolicitation027.021.txt | CHART |
| 11 1 | 31.91% | WE FOUND YOUR RESUME | 1999-10-19 18:24:00 | ICSolicitation011.01.txt | CHART |
| 11 2 | 17.20% | WE FOUND YOUR RESUME | 1999-10-22 16:05:00 | ICSolicitation011.02.txt | CHART |

INTRANET HOME
EMAIL STATISTICS HOME

EMAIL CAMPAIGN SUMMARY 810
WE FOUND YOUR RESUME (W/NAME) Pt. 2

EMAIL(s) SENT IN THIS CAMPAIGN: 900
EMAIL(s) THAT BOUNCED:        0    (0%)
SUCCESSFUL VISITS:            41   (4.56%)
DELETE REQUESTS:              0    (0.00%)
FURTHER DETAILS...

| CATEGORY BREAKDOWN | | |
|---|---|---|
| IT-OTHER | 13 | (31.71%) |
| OTHER | 10 | (24.39%) |
| ADMINISTRATIVE | 5 | (12.20%) |
| ARCHITECT/ENGINEERING | 3 | (7.32%) |
| EXECUTIVE/MANAGEMENT | 3 | (7.32%) |
| MARKETING/ADVERTISING/PR | 2 | (4.88%) |
| FINANCE/ACCOUNTING | 2 | (4.88%) |
| SALES/BUSINESS DEVELOPMENT | 1 | (2.44%) |
| LEGAL/LAW | 1 | (2.44%) |
| CUSTOMER SERVICE/CALL CENTER | 1 | (2.44%) |

| STATE BREAKDOWN | |
|---|---|
| CA | (45.12%) |
| TX | (23.45%) |
| DC | (12.01%) |
| WA | (7.93%) |
| OR | (2.32%) |
| NY | (2.12%) |
| NJ | (2.07%) |
| MA | (1.97%) |

FIG.8B

SYSTEM AND METHOD RELATED TO GENERATING AN EMAIL CAMPAIGN

CROSS-REFERENCE TO RELATED APPLICATIONS

This application is a continuation of U.S. patent application Ser. No. 09/841,186, filed Apr. 25, 2001, which claims the benefit of U.S. Provisional Application No. 60/199,355, filed Apr. 25, 2000. U.S. patent application Ser. No. 09/841,186 is incorporated herein by reference in its entirety.

BACKGROUND OF THE INVENTION

1. Field of the Invention

The present invention is directed to marketing via email, and, in particular, to generating marketing related email.

2. Background Art

The ability to market a product or service to individuals who are accessible on the Internet is becoming increasingly important. Effective ways of contacting these individuals are being sought. For instance, to market to these individuals, email may be sent to the individuals over the Internet, to provide information related to the product or service. Email systems exist today for sending email to a target set of email addresses for purposes such as marketing, information acquisition, and otherwise. A system for sending email to a number of email targets for such purposes may be called an email campaign.

Present email campaigns may suffer from difficulties in locating a pool of relevant individuals to be contacted. In a small email campaign, each email sent is critical to the success of the campaign, and needs to be carefully created. In other situations, large numbers of individuals to be contacted may have been found. This may result in increased difficulty in tailoring the large number of required email messages to the individuals for more effective contact.

Furthermore, once an email campaign has been initiated, difficulties in measuring success of the email campaign are presented. Effective ways for determining whether email recipients have received email from the email campaign have been sought. Also, effective ways for allowing the email recipients to provide feedback have also been sought. It may be desirable for the email recipients to be able to respond with feedback, and for the quantity and content of the responses to be monitored and tracked.

In light of the foregoing, what is needed is an efficient way to create an email campaign.

BRIEF SUMMARY OF THE INVENTION

The present invention is directed to a system for generating an email campaign. An email campaign generator generates an email campaign template from an email target database. The email target database includes at least one email target. An email campaign engine generates a custom email corresponding to each of the email targets in the email target database. The custom email are formed from the email campaign template. The email campaign engine sends each custom email to the corresponding email target. A campaign tracker receives at least one response corresponding to one or more of the sent custom email. The campaign tracker creates a campaign tracking list that includes the received at least one response.

The present invention is further directed to a method for an email campaign. An email target database is received. An email campaign template related to at least one email target in the received email target database is generated. An email customized for each email target is sent to the respective email target. Each customized email is formed from the email campaign template.

The email campaign template can be generated by generating a message template, and generating a configuration file to contain data related to each email target. The data for each email target is insertable in the generated message template. The data may include a custom resource locator address. The custom uniform resource locator (URL) address can be generated for each email target. The generated custom URL address for each email target is inserted into the configuration file. A message authentication code can be generated for each email target. All or a portion of the generated message authentication code for each email target can be appended to a host web address to form the custom URL address for each target.

Further features and advantages of the invention as well as the structure and operation of various embodiments of the present invention are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 8A illustrates an example email campaign history, according to an embodiment of the present invention.

FIG. 8B illustrates an example email campaign summary, according to an embodiment of the present invention.

Figure 11A:
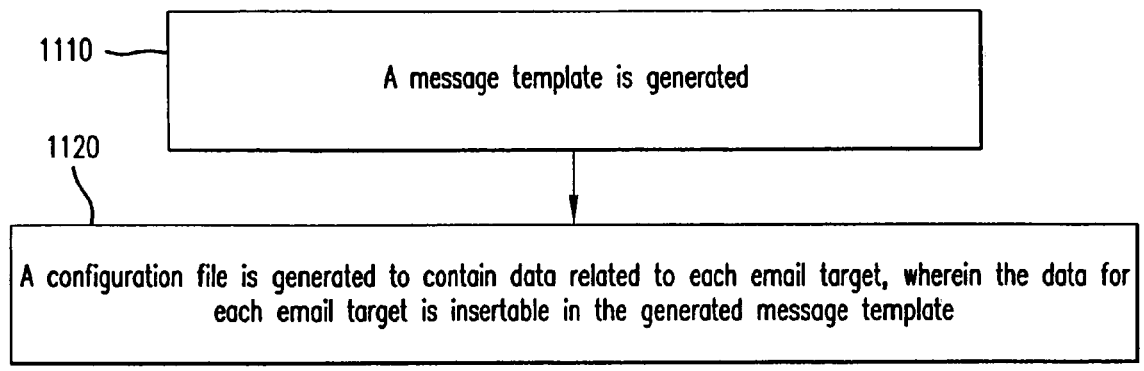
Figure 11B:
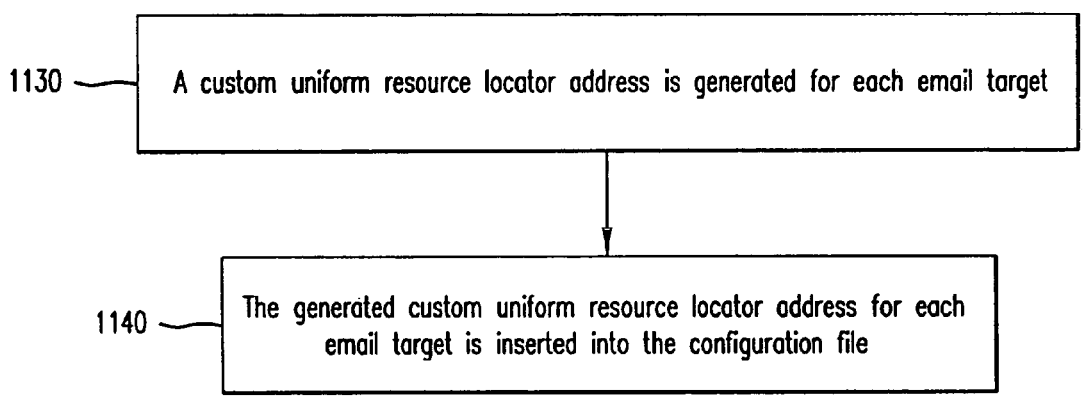
Figure 11C:
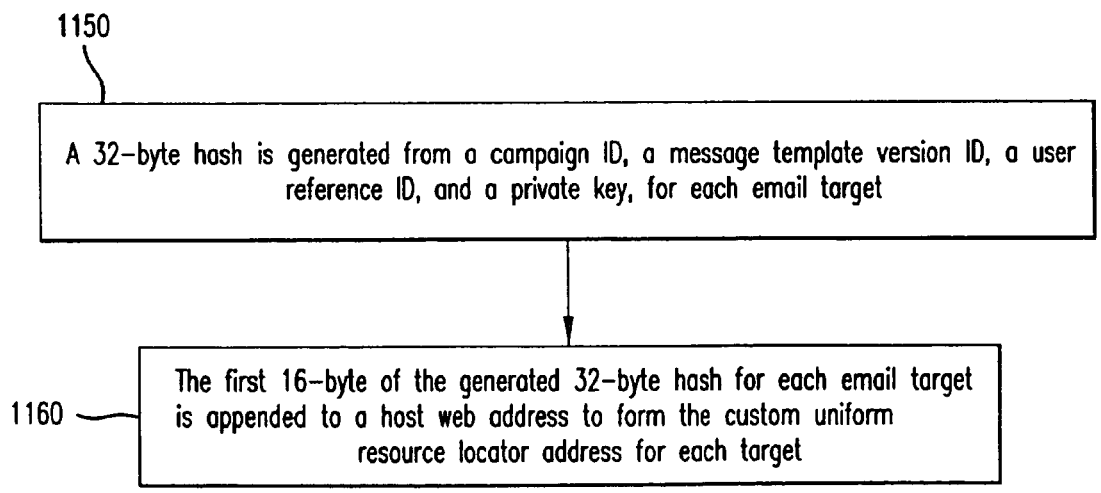

FIGS. 11A-C are flowcharts illustrating sequences of operation related to generating an email campaign template.

Figure 12:
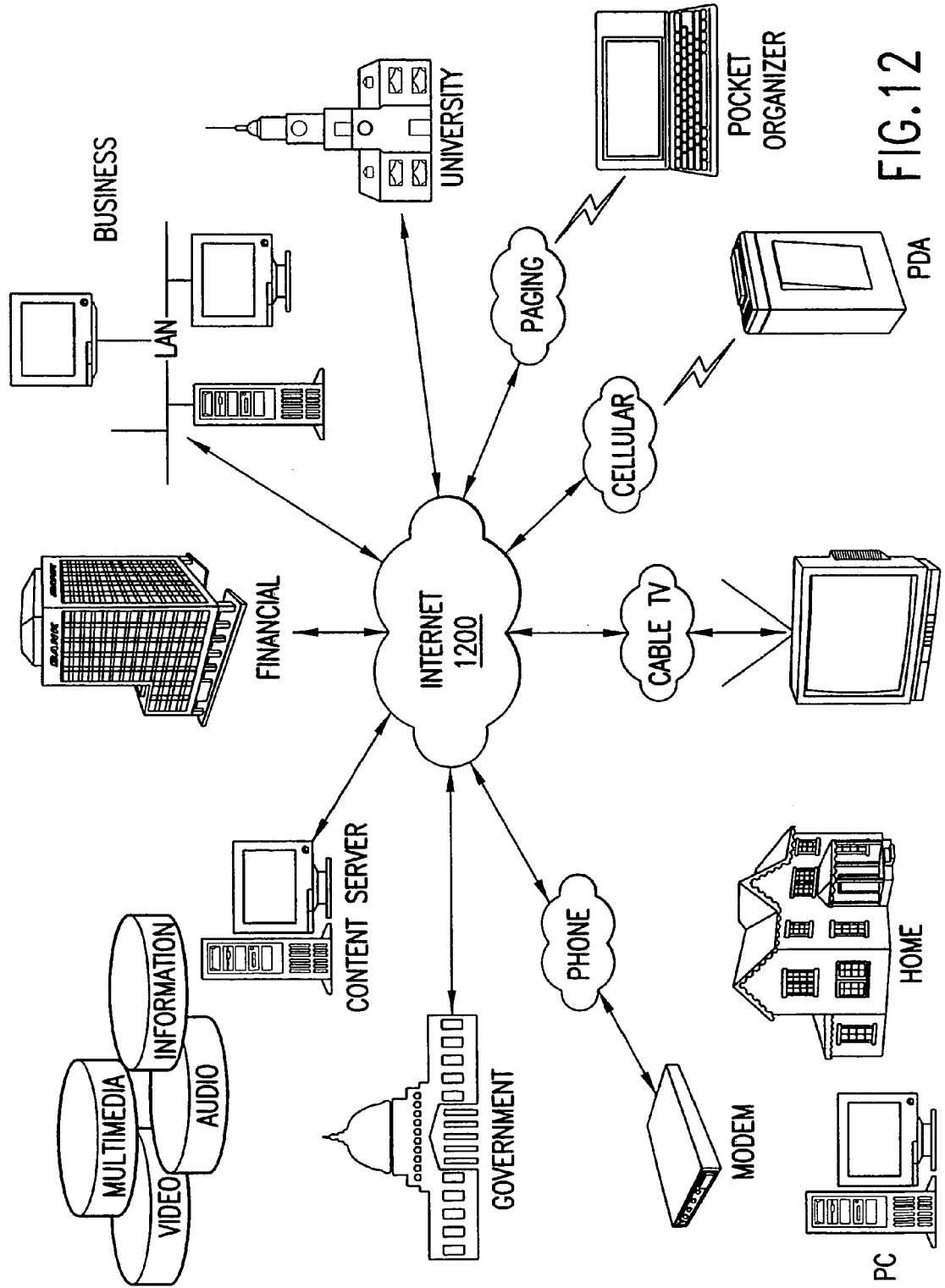

FIG. 12 is a diagram of an example Internet environment according to the present invention.

Figure 13:
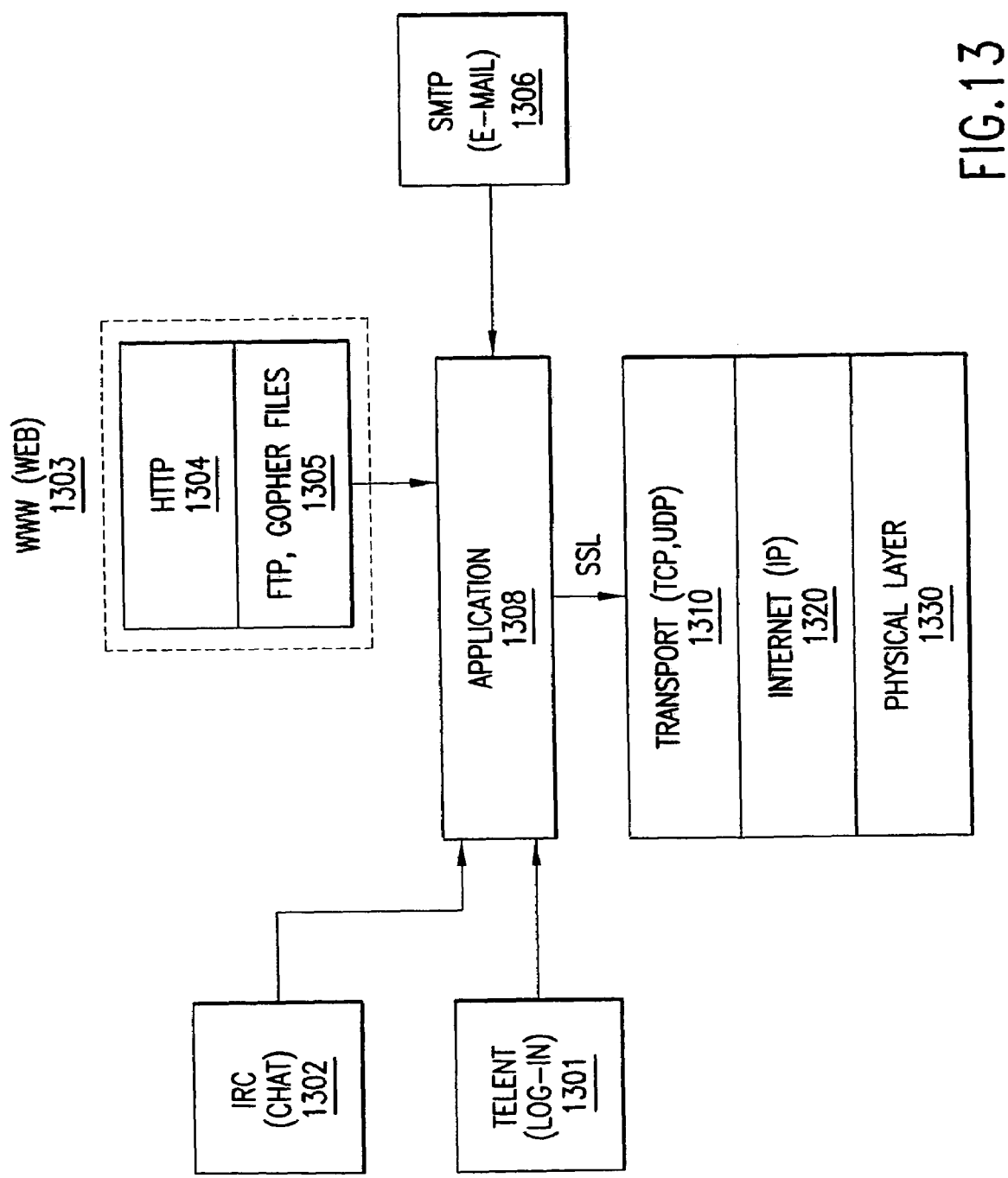

FIG. 13 shows a simplified four-layered communication model supporting Web commerce.

Figure 14:
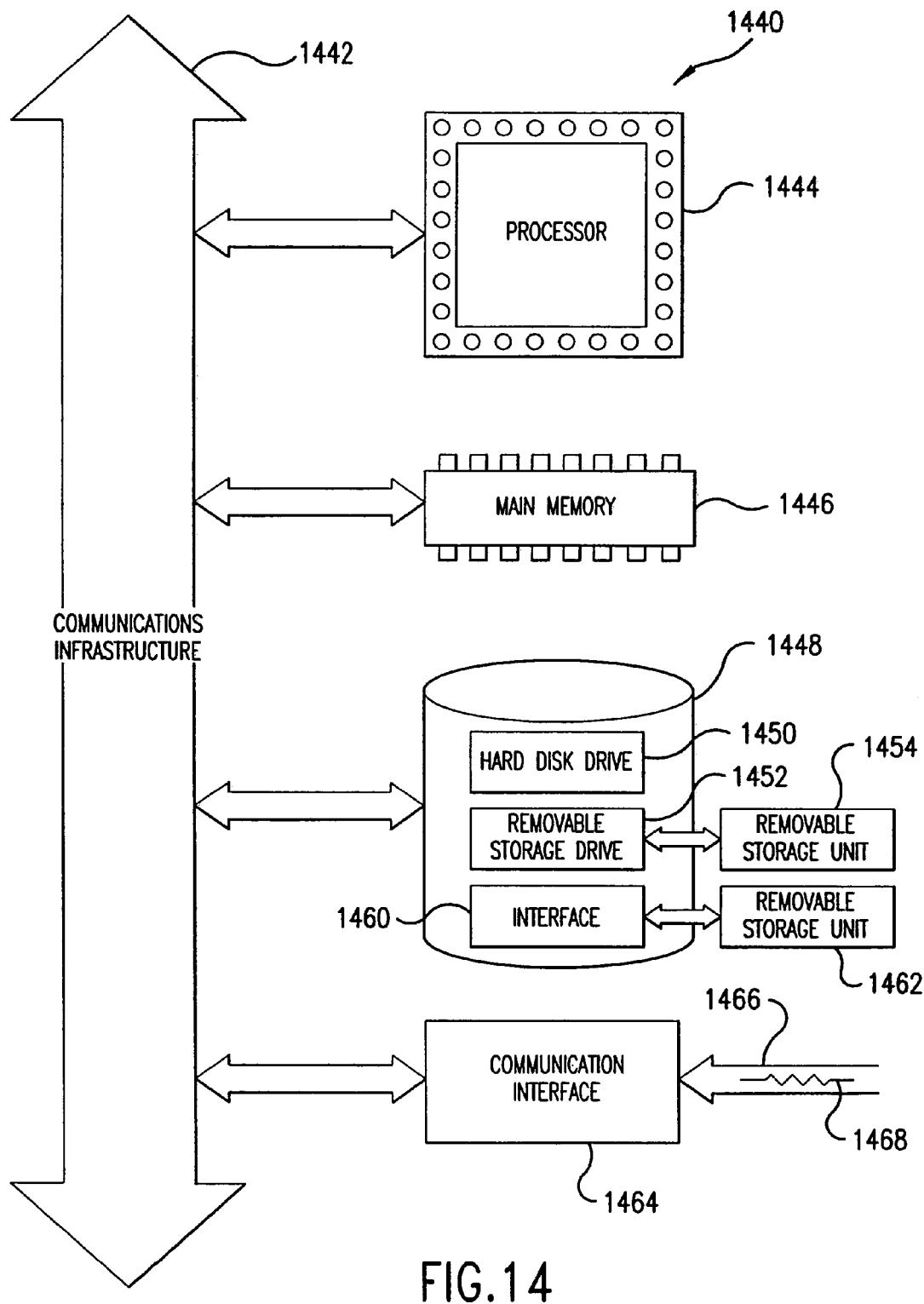

FIG. 14 is a block diagram of a computer system according to an example implementation of the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Overview

The present invention is directed to a method and system for generating and tracking an email campaign. An email campaign generator generates an email campaign template from an email target database. The email target database includes one or more email targets. An email campaign engine generates a custom email corresponding to each of the email targets in the email target database. The custom email are formed from the email campaign template. The email campaign engine sends each custom email to the corresponding email target. A campaign tracker receives at least one response corresponding to one or more of the sent custom email. The campaign tracker creates a campaign tracking list that includes the received at least one response.

In an example embodiment, the email campaign is related to permission-based marketing. For example, the email campaign may be related to permission-based marketing of resumes. The resumes may have been collected by an email campaign host or manager from the Internet by spider engines, or otherwise. The invention determines email targets or email addresses for each resume. This allows the email campaign host or manager to send a custom email to each resume owner, to request their permission to post the resume owner's resume on the email campaign host's web site, for example. The resume owner may provide their permission via a custom uniform resource locator (URL) address provided to the resume owner in the custom email. The resume owner may select the custom URL address, which will open a custom web page displaying the resume owner's collected resume. The resume owner may then optionally edit their collected resume on the web page. The resume owner may also decline to have their resume posted via email or the custom URL.

The invention is also adaptable to information and documents other than resumes, as would be understood by persons skilled in the relevant art(s) from the teachings herein. The alternative information and documents should have an email address associated with them, so that the information and document owners may be contacted by email, as described according to the present invention herein.

The invention is adaptable to any type of web, Internet, network, and other form of electronic communication used for marketing of information, information broadcasting, and any other form of communication tracking and handling.

System Level Description

Figure 1:
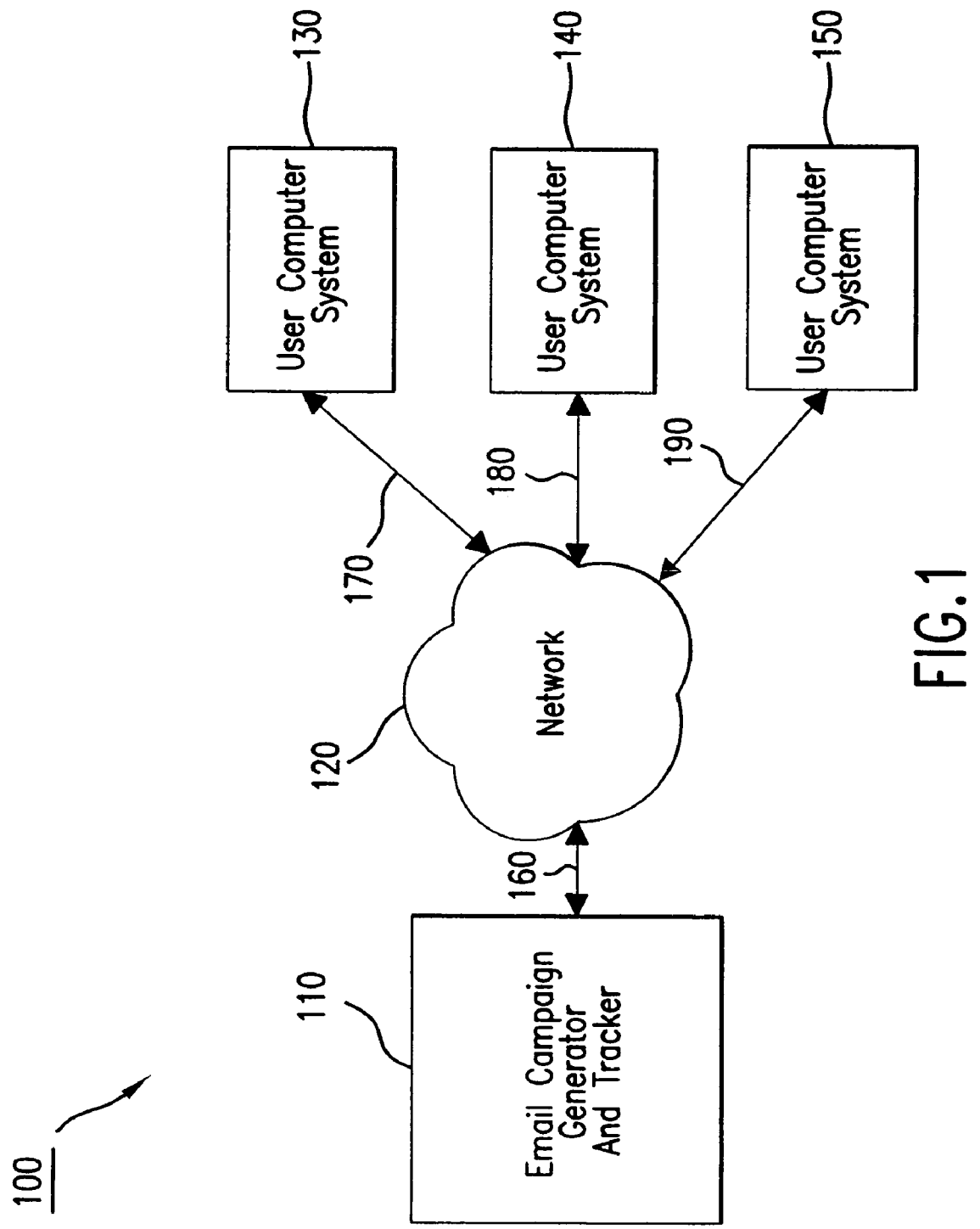
FIG. 1 illustrates an exemplary computer network according to the present invention.

FIG. 1 illustrates an exemplary computer network 100, according to embodiments of the present invention. Computer network 100 includes an email campaign generator and tracker 110, a network 120, a first user computer system 130, a second user computer system 140, and a third user computer system 150.

Email campaign generator and tracker 110 generates and tracks an email campaign, according to the present invention. In embodiments, email campaign generator and tracker 110 receives an email target database. In alternate embodiments, email campaign generator and tracker 110 generates an email target database from raw documentation, such as one or more resumes obtained from the Internet. Email campaign generator and tracker 110 generates a custom email for one or more of the email targets in the email target database, and sends each custom email to the corresponding email target. Email campaign generator and tracker 110 then tracks and organizes responses from the email targets. Email campaign generator and tracker 110 as described in this section and elsewhere herein can be achieved using any number of structural implementations, including hardware, firmware, software, or any combination thereof. For example, email campaign generator and tracker 110 may reside and operate in a computer system. The details of such structural implementations will be apparent to persons skilled in the relevant art(s) based on the teachings contained herein.

Email campaign generator and tracker 110 is coupled to network 120 via first communications link 160. First communications link 160 can be any suitable communications link for interfacing a computer system or other hardware with a network, such as network 120, as would be apparent to a person skilled in the relevant art(s) from the teachings herein.

Network 120 can be any communications network known to persons skilled in the relevant art(s) from the teachings herein. For instance, network 120 can be a network such as a local area network (LAN), an intranet, or the Internet. Examples embodiments for network 120 are further described herein. An example network 120 can include an Internet 1200, which is illustrated in FIG. 12 as described more fully below.

First, second, and third user computer systems 130, 140, and 150 are coupled to network 120 via a second, a third, and a fourth communications link 170, 180, and 190, respectively. First, second, and third user computer systems 130, 140, and 150 can be any computer systems that are configured to receive and send email, and can access web pages. Suitable computer systems would be apparent to a person skilled in the relevant art(s). Any number of user computer systems may interface with network 120, according to embodiments of the present invention.

Second, third, and fourth communications links 170, 180, and 190 can be any suitable communications links for interfacing a computer system or other hardware with a network, such as network 120, as would be recognized by persons skilled in the relevant art(s) from the teachings herein. Various suitable communication links for first, second, third, and fourth communications links 160, 170, 180, and 190 are described below in relation to FIGS. 12-14.

Description in these terms is provided for convenience only. It is not intended that the invention be limited to application in this example network environment. In fact, after reading the following description, it will become apparent to a person skilled in the relevant art(s) how to implement the invention in alternative environments known now or developed in the future.

Email Campaign Generator and Tracker

Figure 2:
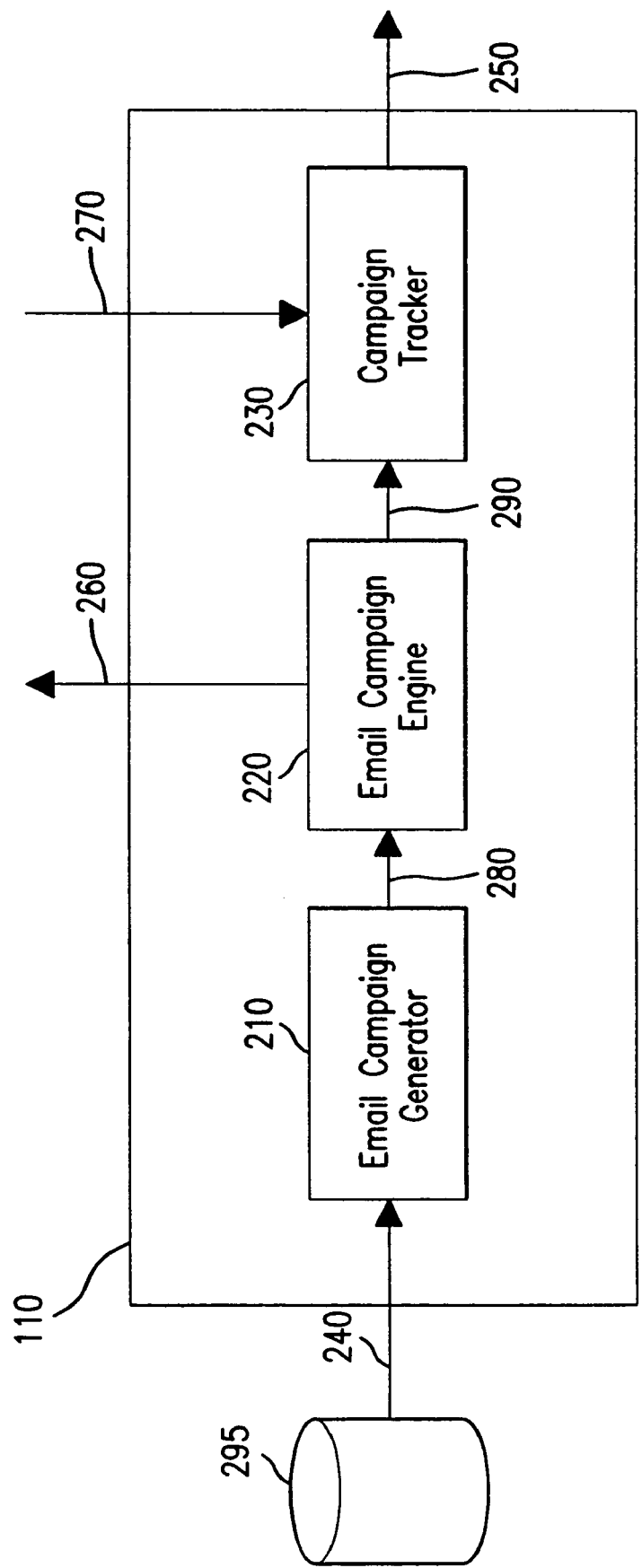
FIG. 2 illustrates an exemplary email campaign generator and tracker, according to an embodiment of the present invention.

FIG. 2 illustrates an exemplary email campaign generator and tracker 110, according to an embodiment of the present invention. Email campaign generator and tracker 110 includes an email campaign generator 210, an email campaign engine 220, and a campaign tracker 230.

Email campaign generator 210 receives an email target database 295. In embodiments, the email campaign generator 210 generates an email campaign template 280 from email target database 295. Email target database 295 includes a plurality of email targets (email addresses, for example). In an embodiment where the email campaign is related to a collection of resumes, email target database 295 may include one or more resumes, each with a corresponding email address for the resume owner.

Figure 3A:
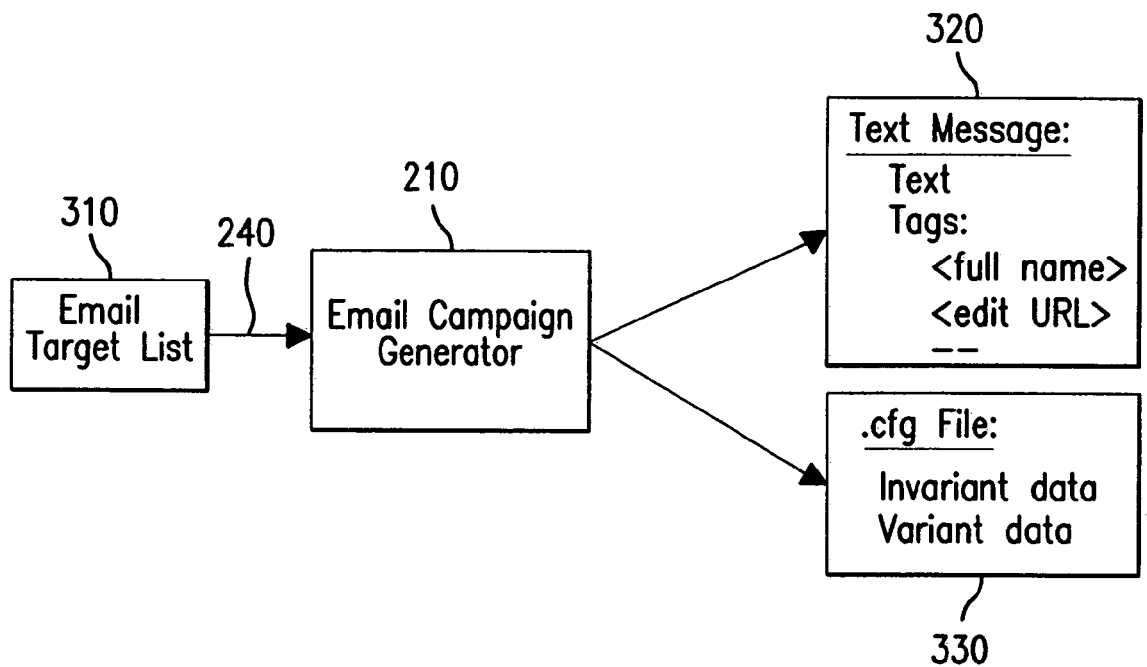
FIG. 3A illustrates structure and operation of an exemplary email campaign generator, according to an embodiment of the present invention.

FIG. 3A illustrates operation and structure of exemplary email campaign generator 210, according to an embodiment of the present invention. Email campaign generator 210 receives an email target list 310. In an embodiment, email campaign generator 210 requests email target list 310 according to a structured query language (SQL) statement, as would be understood by persons skilled in the relevant art(s) from the teachings herein. Email target database 295 may include email target list 310.

Email campaign generator 210 outputs a text message file 320 and a configuration file 330. Text message file 320 and configuration file 330 are included in email campaign template 280.

Text message file 320 is a customized text message for the current email campaign. Hence, text message file 320 contains a textual message for an email recipient. Text message file 320 also contains a series of custom tags to be filled in with email recipient specific data, such as the recipient's full name, other recipient specific data, and a custom URL. When a custom email is received from the current email campaign, the recipient may select the custom URL in the received email, which will open a web page for the recipient that the email campaign manager desires the recipient to view.

Configuration file 330 is generated to contain data related to each email target or recipient. The data for each email target is insertable in the message template created from text message file 320. This data may include invariant data and variant data, as shown in FIG. 3A. Invariant data may include information such as the subject line of the email message (i.e., "we found your resume"), and other items in the email message that will not vary from email to email in a particular email campaign. The invariant data may also include email source server information. Variant data may include custom information used to fill in the custom tags of text message file 320, such as full name="John Jones".

Figure 3B:
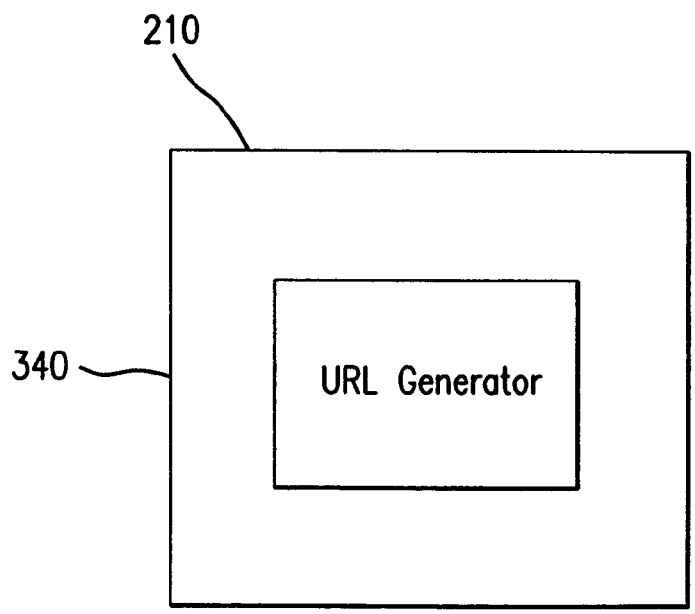
FIG. 3B illustrates an exemplary email campaign generator, according to an embodiment of the present invention.

In an embodiment, email campaign generator 210 creates a custom URL. FIG. 3B illustrates an example email campaign generator 210, according to an embodiment of the present invention. Email campaign generator 210 includes a URL generator 340. In an embodiment, URL generator 340 uses an MD5 hash to create a custom URL for each email target or recipient. Other message authentication code generators other than MD5 may be adapted for this use, as would be recognized by persons skilled in the relevant art(s) from the teachings herein.

Figure 6:
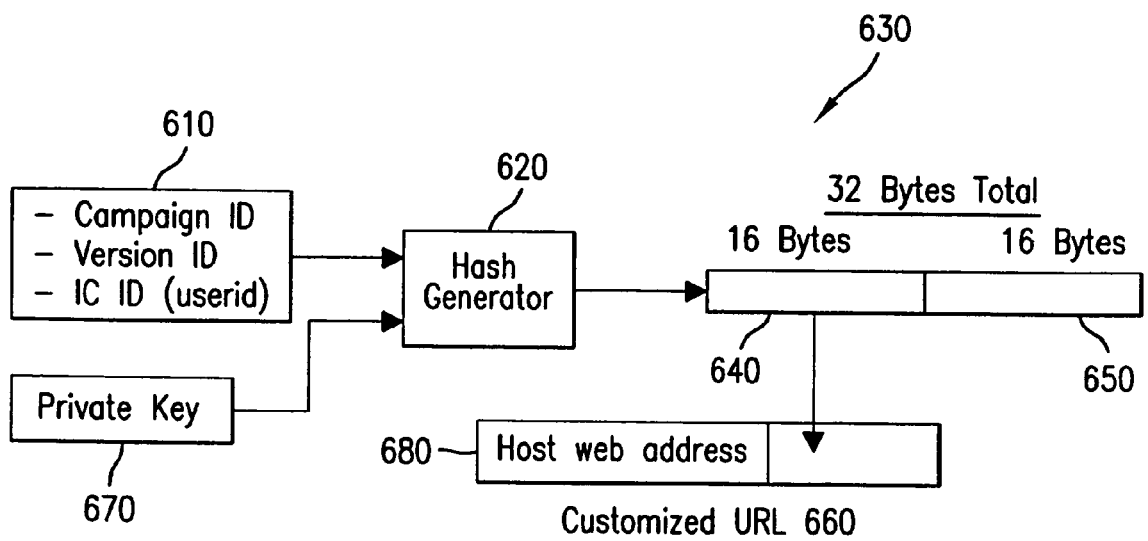
FIG. 6 illustrates generation of a customized URL address, according to an example embodiment of the present invention.

FIG. 6 illustrates generation of a customized URL 660, according to an example embodiment of the present invention. For example, URL generator 340 may operate according to the operation and structure shown in FIG. 6. A custom URL address is typically generated for each email target, although in some situations it may be advantageous to provide the same URL address to one or more recipients. The generated custom URL address for each email target is inserted as data into configuration file 330.

As shown in FIG. 6, a hash generator 620 receives ID file 610. ID file 610 includes a campaign ID, a version ID, and an IC (independent contractor) ID (userid). The campaign ID is unique for each email campaign conducted. The version ID is the current version of text message file 320. The IC ID is a unique ID for the current email target.

Hash generator 620 further receives a private key 670. Private key 670 is a private key or password unique to the email campaign host, as would be understood by persons skilled in the relevant art(s) from the teachings herein.

Hash generator 620 generates a 32-byte hash 630 from the campaign ID, the version ID, the IC ID, and the private key 670, for each email target. For example, hash generator 620 may use MD5 to create hash 630. The invention is applicable to hash sizes other than 32-bytes, although a 32-byte hash is provided as an example herein.

16 bytes of the generated 32-byte hash 630 are appended to a host web address 680 to form customized URL 660 for each email target. Either a first 16 bytes 640 or a second 16 bytes 650 of 32-byte hash 630 may be appended to host web address 680. Other portions of generated hash 630 may also be used.

Various host web addresses may be used for host web address 680. In an example embodiment, a generic host web address 680 is equal to:

hostname/module?token where "hostname", "module", and "token" are replaceable parameters. "hostname" may be replaced by any addressable Internet address, such as "www.icplanet.com". "module" may be replaced by any identifier or filename for software that handles execution of the link of customized URL 660 when it is selected by the email recipient. "token" may be replaced with any collection of numbers or letters that identify unique information related to customized URL 660. For example, host web address 680 may be equal to:

www.hostname.com/rz.cfm?a=&b=&c= where "hostname" is equal to "www.hostname.com", "module" is equal to "rz.cfm", and token is equal to "&a=&b=&c=".

When an email target or recipient receives customized URL 660 in the custom email message, the recipient may select it, to view their custom web site, which is hosted at the email campaign host. The email campaign host compares the incoming URL address request to local data tables to verify the validity of the URL recipient, to allow the recipient access to the web page. Once the recipient is verified, the recipient may view and edit the web site. For example, when the web page represents the recipient's resume, the recipient may edit their posted resume.

In the described embodiment, 16 bytes of the 32 byte hash are utilized because, in tools such as Eudora and Outlook, text is cut off at 72 characters, and then does a word wrap. Hence, a "clickable" URL sent via email that is longer than 72 characters would wrap, and may then become an unexecutable link. Using 16 bytes of the 32 byte hash keeps the URL address length below the 72 character limit, avoiding word wrap.

Figure 4:
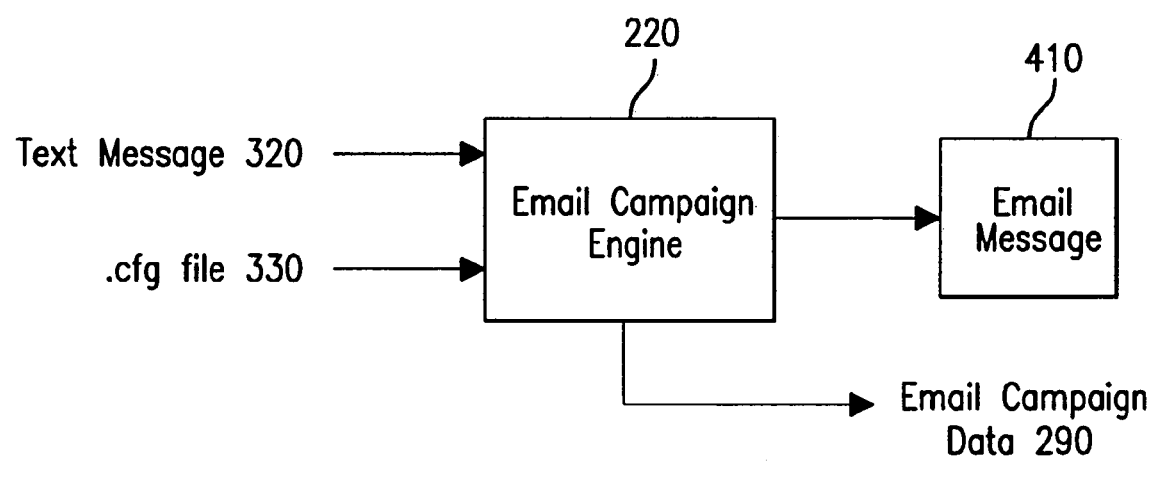
FIG. 4 illustrates structure and operation of an exemplary email campaign engine, according to an embodiment of the present invention.

As shown in FIG. 2, email campaign engine 220 receives email campaign template 280, and outputs email 260 and email campaign data 290. Email 260 includes one or more custom email messages. Email campaign data 290 is described more fully elsewhere herein. FIG. 4 illustrates operation and structure of an exemplary email campaign engine 220, according to an embodiment of the present invention. Email campaign engine 220 receives text message file 320 and configuration file 330.

Email campaign engine 220 generates a custom email message 410 corresponding to each email target in email target database 295. Email message 410 is formed from email campaign template 280 (text message file 320 and configuration file 330). Email campaign engine 220 copies text message file 320, and replaces each custom tag in text message file 320 with corresponding data in configuration file 330, to generate custom email message 410. For example, customized URL 660 may be inserted for a corresponding custom tag in custom email message 410. Email campaign engine 220 sends each custom email message 410 to a corresponding email target.

Email campaign engine 220 also outputs email campaign data 290. For example, email campaign data 290 includes any data that may be utilized by campaign tracker 230.

Figure 5:
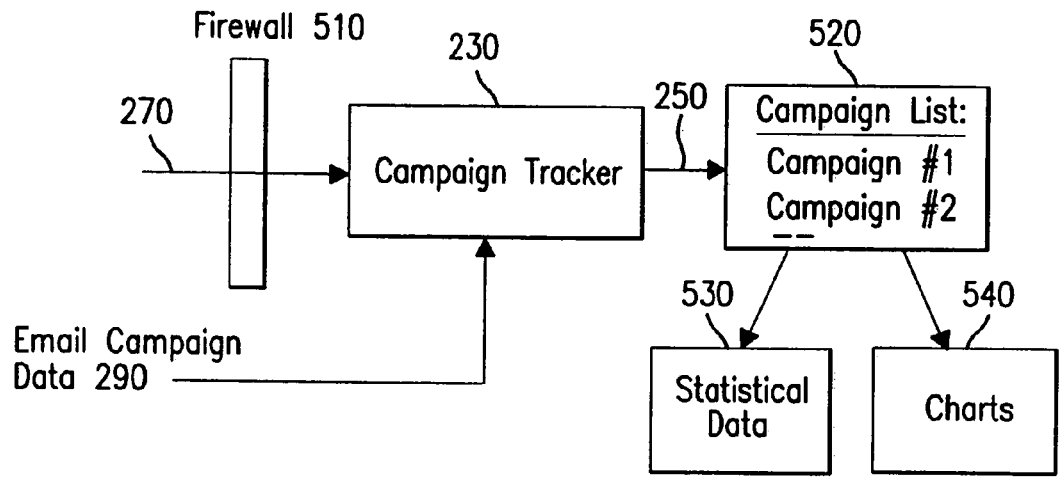
FIG. 5 illustrates structure and operation of an exemplary campaign tracker, according to an embodiment of the present invention.

As shown in FIG. 2, campaign tracker 230 receives email campaign data 290 and a response 270, and outputs tracking information 250. FIG. 5 illustrates operation of an exemplary campaign tracker 230, according to an embodiment of the present invention. Campaign tracker 230 receives a response 270 and email campaign data 290. Response 270 is typically a URL access or a sent email, which may occur through a firewall 510, when present. Campaign tracker 230 outputs tracking information 250. Tracking information 250 includes a campaign tracking list 520.

Each response 270 corresponds to a sent custom email message 410 and is received from the recipient of that sent custom email message 410. For example, response 270 for a particular sent custom email message 410 may be created by the email recipient by executing customized URL 660 in the custom email. Campaign tracker 230 creates campaign tracking list 520 that includes data related to each response 270.

Campaign tracking list 520 may include links to other pages, such as statistical data page 530 and charts 540.

FIG. 8A illustrates an exemplary campaign tracking list 520, email campaign history 800, according to an embodiment of the present invention. Email campaign history 800 illustrates various parameters and measured data related to a number of email campaigns. For example, email campaign history 800 may be displayed in a computer system display/graphical user interface.

Email campaign history 800 includes a campaign ID column 802, a hits column 804, a subject column 806, a date column 808, a message text column 812, and a demographics column 814. Campaign ID column 802 includes a list of identifiers for one or more email campaigns. Identifiers in campaign ID column 802 may be selected to display further information on a particular email campaign, as further described below. Hits column 804 includes an indication of the number or percentage of successful hits for email campaigns listed in campaign ID column 802. For example, a successful hit may be declared when an email recipient selects their customized URL 660. Subject column 806 provides a brief description for email campaigns listed in campaign ID column 802. Date column 808 includes a date and time indication of the initiation of email campaigns listed in campaign ID column 802. Message text column 812 displays an identifier for the text of an email used in email campaigns listed in campaign ID column 802. For example, if an identifier in message text column 812 is selected, the text of an email, such as text message file 320 of FIG. 3A corresponding to the email campaign, may be displayed. Demographics column 814 allows for one or more demographics charts to be displayed for email campaigns listed in campaign ID column 802.

By selecting a campaign ID in campaign ID column 802 of email campaign history 800, a user may display a campaign statistical data page 530, as shown in FIG. 5. For example, if a first campaign ID 816 in FIG. 8A is selected, a user may display an email campaign summary 810, an example of which is shown in FIG. 8B. Email campaign summary 810 shows a variety of statistical data related to the email campaign of first campaign ID 816.

The email campaign generator and tracker of the present invention is not limited to these implementations. The email generator and tracker, and its elements, as described in this section can be achieved using any number of structural implementations, including hardware, firmware, software, or any combination thereof. The details of such structural implementations will be apparent to persons skilled in the relevant art(s) based on the teachings contained herein.

Operation

Exemplary operational and/or structural implementations related to the structure(s), and/or embodiments described above are presented in this section (and its subsections). These components and methods are presented herein for purposes of illustration, and not limitation. The invention is not limited to the particular examples of components and methods described herein. Alternatives (including equivalents, extensions, variations, deviations, etc., of those described herein) will be apparent to persons skilled in the relevant art(s) based on the teachings contained herein. Such alternatives fall within the scope and spirit of the present invention.

Figure 9:
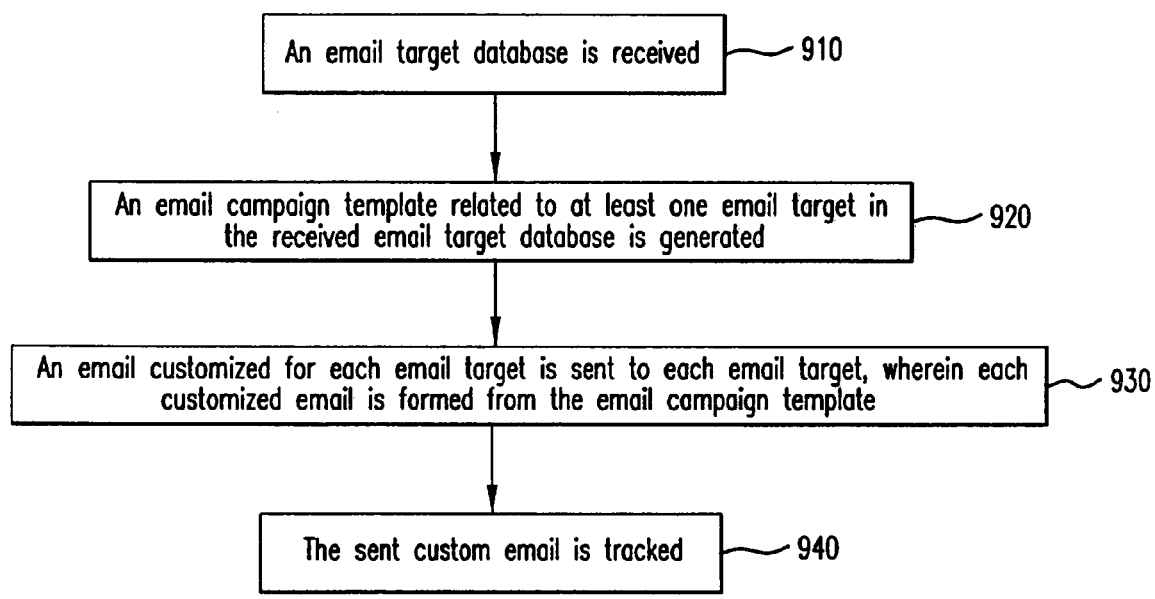
FIG. 9 is a flowchart illustrating a sequence of operation according to an embodiment of the present invention.

FIG. 9 shows a flowchart providing detailed operational steps of an example embodiment of the present invention. The steps of FIG. 9 can be implemented in hardware, firmware, software, or a combination thereof. For instance, the steps of FIG. 9 can be implemented by email campaign generator and tracker 110, and/or apportioned among email campaign generator 210, email campaign engine 220, and campaign tracker 230. Other structural embodiments will be apparent to persons skilled in the relevant art(s) based on the discussion contained herein. These steps are described in detail below.

The process begins with step 910. In step 910, an email target database is received. In embodiments, the email target database is requested according to a structured query language (SQL) statement, as would be understood by persons skilled in the relevant art(s) from the teachings herein. In embodiments, the email target database is received from a resume database vendor, is generated from resume data gathered by a spider engine, or is otherwise previously generated. For example, the email target database is email target database 295 shown in FIG. 2. In embodiments, the email target database is generated from raw resume documents and/or other related data. Refer to further description related to FIG. 7 herein for example structure for an email target database generator, and to FIG. 10 herein for example operational steps related to email target database generation.

In step 920, an email related to at least one email target in the received email target database is generated. For example, the generated email campaign template is email campaign template 280, which includes text message file 320 and configuration file 330.

In step 930, an email customized for each email target is sent to each email target, wherein each customized email is formed from the email campaign template. In embodiments, a customized email for each email target is formed from the generated text message template and the generated configuration file. For example, the customized email is custom email message 410.

In step 940, the sent custom email is tracked. In embodiments, at least one response is received from a respondent corresponding to one of the sent customized email, and a campaign tracking list is created from the received at least one response. For example, campaign tracker 230 receives response 270, and outputs campaign tracking list 520, as shown in FIG. 5.

In embodiments, creating the campaign tracking list includes determining various parameters. This may include determining a number of successful visits from respondents, determining a number of sent customized email that were undeliverable (e.g., email did not find their respective target email addresses), and determining a number of respondents that requested deletion.

FIGS. 11A-C illustrate flowcharts providing operational embodiments for implementing at least a portion of the operation of step 920 in FIG. 9. The steps of FIGS. 11A-C can be implemented in hardware, firmware, software, or a combination thereof. Other structural embodiments will be apparent to persons skilled in the relevant art(s) based on the discussion contained herein. These steps are described in detail below.

The steps shown in FIG. 11A may occur in any order. The process in FIG. 11A begins with step 1110. In step 1110, a message template is generated. For example, the message template is text message file 320 shown in FIG. 3A.

In step 1120, a configuration file is generated to contain data related to each email target, wherein the data for each email target is insertable in the generated message template. For example, the configuration file is configuration file 330 shown in FIG. 3A.

The process in FIG. 11B begins with step 1130. In step 1130, a custom URL address is generated for each email target. For example, the custom URL address is customized URL 660 shown in FIG. 6.

In step 1140, the generated custom URL address for each email target is inserted into the configuration file.

The process in FIG. 11C begins with step 1150. In step 1150, a 32-byte hash is generated from a campaign ID, a message template version ID, a user reference ID, and a private key, for each email target. As described above, MD5 or other message authentication code generator may be used to generate the hash. Other hash sizes than 32 bytes may be generated.

In step 1160, the first 16 bytes of the generated 32-byte hash for each email target is appended to a host web address to form the custom URL address for each email target. The invention is applicable to appending other portions of the hash. In an embodiment, as described above, the host web address may be equal to:

hostname/module?token where "hostname", "module", and "token" are replaceable parameters that are more fully described above.

These embodiments are provided for purposes of illustration, and are not intended to limit the invention. Alternate embodiments, differing slightly or substantially from those described herein, will be apparent to persons skilled in the relevant art(s) based on the teachings contained herein.

Email Target Database

Figure 7:
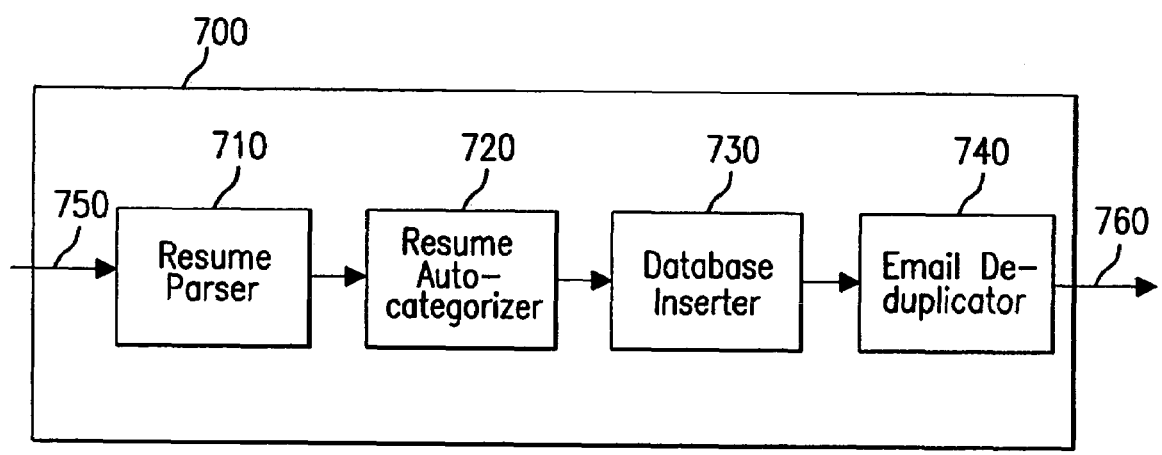
FIG. 7 illustrates an exemplary email target database generator, according to an embodiment of the present invention.

FIG. 7 illustrates an exemplary email target database generator 700, according to an embodiment of the present invention. For example, email target database generator 700 may generate email target database 295 shown in FIG. 2. For exemplary purposes, email target database generator 700 is described below in reference to the processing of collected resumes. It will be understood by a person skilled in the relevant art(s) from the teachings herein, that the email target database generator 700 of the present invention is applicable to the processing of any document type.

Email target database generator 700 includes a resume parser 710, a resume auto-categorizer, a database inserter 730, and an email-de-duplicator 740.

Email target database generator 700 receives raw data 750. In embodiments, raw data 750 may be a collection of resumes, or other resume related data. As described above, in alternative embodiments, raw data 750 may include a collection of other types of documentation or information. This data may be based on templates and other descriptor files.

Resume parser 710 receives raw data 750. Resume parser 710 includes one or more programs that identify parts of a resume. Resume parser 710 detects sections of resumes (e.g., education, summary, work history, etc.), and breaks the resumes into separate series of files. In alternative embodiments, parser 710 may be adapted to parsing other document types or information.

Resume auto-categorizer 720 receives the output of resume parser 710. Resume. auto-categorizer 720 analyzes the received collection of information, and executes a keyword matching operation on the information. For example, in an embodiment related to resumes, resume auto-categorizer 720 maintains a list of job categories and whole collection of associated keywords, scores the keywords (e.g., if it finds a keyword many times in a resume, it gives that resume a high score). For instance, one particular resume may receive a rating of "10" in information technology, and a "2" in management.

Database inserter 730 receives the output of resume auto-categorizer, and inserts all of the resume-related information, or other information, into a database.

Email de-duplicator 740 receives the output of database inserter 730, and searches for duplicate email addresses due potentially due to duplicate resumes or other documents collected. Email de-duplicator 740 eliminates duplicates so that each email target receives a single custom email.

Email de-duplicator outputs resume database information 760, which in an embodiment may be all or a portion of email target database 295.

The email target database generator of the present invention is not limited to these implementations. The email target database generator as described in this section can be achieved using any number of structural implementations, including hardware, firmware, software, or any combination thereof. The details of such structural implementations will be apparent to persons skilled in the relevant art(s) based on the teachings contained herein.

Figure 10:
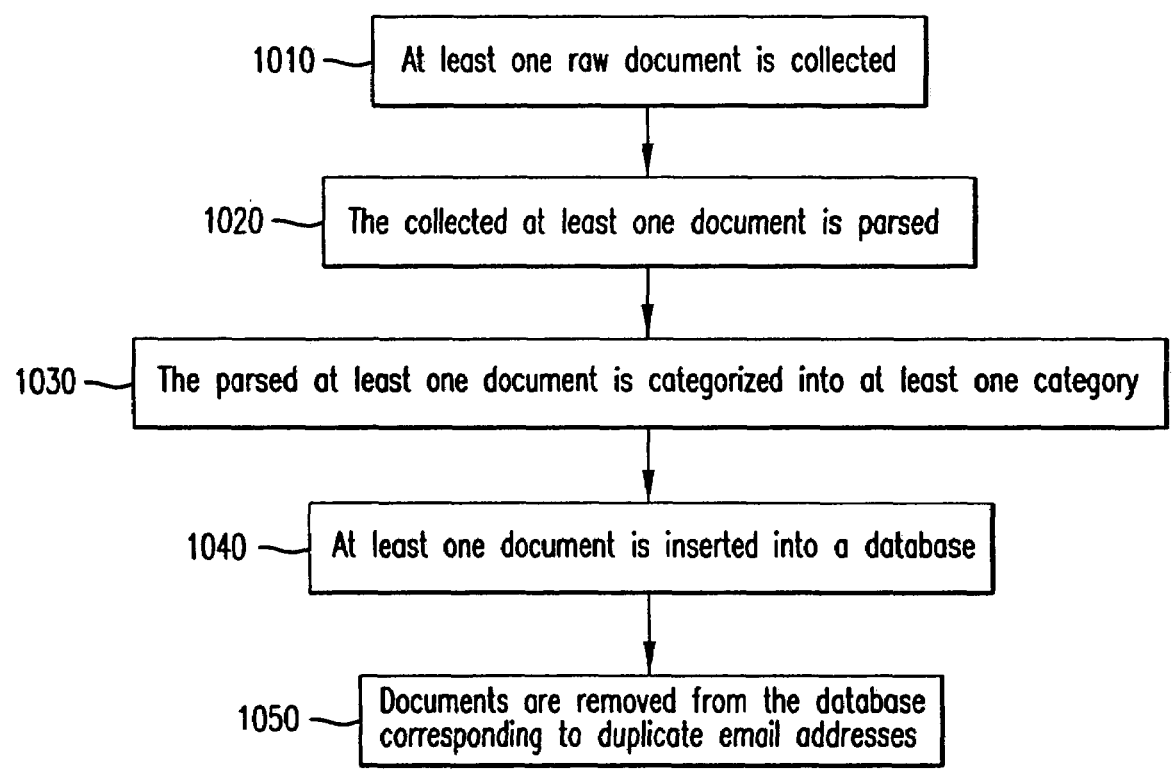
FIG. 10 is a flowchart illustrating a sequence of operation for generating an email target database, according to an embodiment of the present invention.

FIG. 10 shows a flowchart providing detailed operational steps of an example embodiment of the email target database generator of the present invention. The steps of FIG. 10 can be implemented in hardware, firmware, software, or a combination thereof. For instance, the steps of FIG. 10 can be implemented by email target database generator 700, and/or apportioned among resume parser 710, resume auto-categorizer 720, database inserter 730, and email de-duplicator 740. Furthermore, the steps of FIG. 10 do not necessarily have to occur in the order shown, as will be apparent to persons skilled in the relevant art(s) based on the teachings herein. Other structural embodiments will be apparent to persons skilled in the relevant art(s) based on the discussion contained herein. These steps are described in detail below.

The process begins with step 1010. In step 1010, at least one raw document is collected. For example, the one or more raw documents may be resumes.

In step 1020, the collected at least one document is parsed.

In step 1030, the parsed at least one document is categorized into at least one category. For example, when the documents are resumes, the at least one category may be at least one job category.

In step 1040, the at least one document is inserted into a database.

In step 1050, documents corresponding to duplicate email addresses are removed from the database.

These embodiments are provided for purposes of illustration, and are not intended to limit the invention. Alternate embodiments, differing slightly or substantially from those described herein, will be apparent to persons skilled in the relevant art(s) based on the teachings contained herein.

EXAMPLE NETWORK ENVIRONMENT

The present invention can be implemented in conjunction with any communication network, such as the Internet, which supports interactive services and applications. In particular, the present invention can be implemented in any Web service, preferably a Web service supporting secure transactions, such as, the Secure Socket Layer (SSL) protocol and/or using a Secure HyperText Transport Protocol (S-HTTP). In one example, the present invention is implemented in a multi-platform (platform independent) programming language such as Java 1.1. Java-enabled browsers are used, such as, Netscape, Hotjava, and Microsoft Explorer browsers. Active content Web pages can be used. Such active content Web pages can include Java applets or ActiveX controls, or any other active content technology developed now or in the future. The present invention, however, is not intended to be limited to Java or Java-enabled browsers, and can be implemented in any programming language and browser, developed now or in the future, as would be apparent to a person skilled in the art given this description.

FIG. 12 is a diagram of an example internetwork environment according to the present invention. FIG. 12 shows a communication network or combination of networks (Internet) 1200, which can support the invention. Internet 1200 consists of interconnected computers that support communication between many different types of users including businesses, universities, individuals, government, and financial institutions. Internet 1200 supports many different types of communication links implemented in a variety of architectures. For example, voice and data links can be used including phone, paging, cellular, and cable TV (CATV) links. Terminal equipment can include local area networks, personal computers with modems, content servers of multimedia, audio, video, and other information, pocket organizers, Personal Data Assistants (PDAs), and set-top boxes.

Communication over a communication network, such as Internet 1200, is carried out through different layers of communication. FIG. 13 shows a simplified four-layered communication model supporting Web commerce including an application layer 1308, transport layer 1310, Internet layer 1320, physical layer 1330. As would be apparent to a person skilled in the art, in practice, a number of different layers can be used depending upon a particular network design and communication application. Application layer 1308 represents the different tools and information services which are used to access the information over the Internet. Such tools include, but are not limited to, Telnet log-in service 1301, IRC chat 1302, Web service 1303, and SMTP (Simple Mail Transfer Protocol) electronic mail service 1306. Web service 1303 allows access to HTTP documents 1304, and FTP and Gopher files 1305. A Secure Socket Layer (SSL) is an optional protocol used to encrypt communications between a Web browser and Web server.

Description of the example environment in these terms is provided for convenience only. It is not intended that the invention be limited to application in this example environment. In fact, after reading the following description, it will become apparent to a person skilled in the relevant art how to implement the invention in alternative environments.

EXAMPLE COMPUTER SYSTEM

An example of a computer system 1440 is shown in FIG. 14. The computer system 1440 represents any single or multi-processor computer. Single-threaded and multi-threaded computers can be used. Unified or distributed memory systems can be used.

Computer system 1440 includes one or more processors, such as processor 1444. One or more processors 1444 can execute software implementing routine 400 as described above. Each processor 1444 is connected to a communication infrastructure 1442 (e.g., a communications bus, crossbar, or network). Various software embodiments are described in terms of this exemplary computer system. After reading this description, it will become apparent to a person skilled in the relevant art how to implement the invention using other computer systems and/or computer architectures.

Computer system 1440 also includes a main memory 1446, preferably random access memory (RAM), and can also include a secondary memory 1448. The secondary memory 1448 can include, for example, a hard disk drive 1450 and/or a removable storage drive 1452, representing a floppy disk drive, a magnetic tape drive, an optical disk drive, etc. The removable storage drive 1452 reads from and/or writes to a removable storage unit 1454 in a well known manner. Removable storage unit 1454 represents a floppy disk, magnetic tape, optical disk, etc., which is read by and written to by removable storage drive 1452. As will be appreciated, the removable storage unit 1454 includes a computer usable storage medium having stored therein computer software and/or data.

In alternative embodiments, secondary memory 1448 can include other similar means for allowing computer programs or other instructions to be loaded into computer system 1440. Such means can include, for example, a removable storage unit 1462 and an interface 1460. Examples can include a program cartridge and cartridge interface (such as that found in video game devices), a removable memory chip (such as an EPROM, or PROM) and associated socket, and other removable storage units 1462 and interfaces 1460 which allow software and data to be transferred from the removable storage unit 1462 to computer system 1440.

Computer system 1440 can also include a communications interface 1464. Communications interface 1464 allows software and data to be transferred between computer system 1440 and external devices via communications path 1466. Examples of communications interface 1464 can include a modem, a network interface (such as Ethernet card), a communications port, etc. Software and data transferred via communications interface 1464 are in the form of signals which can be electronic, electromagnetic, optical or other signals capable of being received by communications interface 1464, via communications path 1466. Note that communications interface 1464 provides a means by which computer system 1440 can interface to a network such as the Internet.

The present invention can be implemented using software running (that is, executing) in an environment similar to that described above with respect to FIG. 12. In this document, the term "computer program product" is used to generally refer to removable storage drive 1452, a hard disk installed in hard disk drive 1450, or a carrier wave carrying software over a communication path 1466 (wireless link or cable) to communication interface 1464. A computer useable medium can include magnetic media, optical media, or other recordable media, or media that transmits a carrier wave or other signal. These computer program products are means for providing software to computer system 1440. For instance, in embodiments, email campaign generator and tracker 110 is implemented as one or more computer programs. Furthermore, the example modules of email campaign generator and tracker 110 shown in FIG. 2, may be implemented as one or more separate computer programs.

Computer programs (also called computer control logic) are stored in main memory 1446 and/or secondary memory 1448. Computer programs can also be received via communications interface 1464. Such computer programs, when executed, enable the computer system 1440 to perform the features of the present invention as discussed herein. In particular, the computer programs, when executed, enable the processor 1444 to perform the features of the present invention. Accordingly, such computer programs represent controllers of the computer system 1440.

The present invention can be implemented as control logic in software, firmware, hardware or any combination thereof. In an embodiment where the invention is implemented using software, the software may be stored in a computer program product and loaded into computer system 1440 using removable storage drive 1452, hard drive 1450, or interface 1460. Alternatively, the computer program product may be downloaded to computer system 1440 over communications path 1466. The control logic (software), when executed by the one or more processors 1444, causes the processor(s) 1444 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for conducting an email campaign, comprising the steps of:

(1) receiving an email target database;
    (2) generating an email campaign template related to at least one email target in the received email target database, wherein step (2) comprises:
        (a) generating a message template, and
        (b) generating a configuration file to contain data related to each of the at least one email target, wherein the data is insertable in the generated message template; and
    (3) sending to each of the at least one email target a corresponding custom email, wherein the custom email is formed from the email campaign template.

2. The method of claim 1, wherein step (1) comprises the step of:
    (a) generating the email target database.

3. The method of claim 2, wherein step (a) comprises the steps of:
    (i) collecting at least one raw document;
    (ii) parsing said collected at least one document;
    (iii) categorizing said parsed at least one document into at least one category;
    (iv) inserting said at least one document into a database; and
    (v) removing documents from the database corresponding to duplicate email addresses.

4. The method of claim 1, wherein step (1) comprises the step of:
    (a) requesting an email target database according to a structured query language statement.

5. The method of claim 1, wherein step (1) comprises the step of:
    (a) receiving an email target database from a database vendor.

6. The method of claim 1, wherein step (b) comprises the steps of:
    (i) generating a custom uniform resource locator address for each of the at least one email target; and
    (ii) inserting the generated custom uniform resource locator address for each of the at least one email target into the configuration file.

7. The method of claim 6, wherein step (i) comprises the steps of:
    (A) generating a hash from a campaign ID, a message template version ID, a user reference ID, and a private key, for each of the at least one email target; and
    (B) appending a first portion of the generated hash for each of the at least one email target to a host web address to form the custom uniform resource locator address for each of the at least one email target.

8. The method of claim 7, wherein the host web address is equal to:

hostname/module?token where hostname is replaced with an email campaign host Internet address,
    module is replaced with an identifier for software located at the email campaign host directed to processing the custom uniform resource locator address for each email target after it is selected, and
    token is replaced with any alphanumeric identifier for unique information related to the customized uniform resource locator address for each of the at least one email target.

9. The method of claim 1, wherein step (3) comprises the step of:
   (a) forming the custom email for each of the at least one email target from the generated text message template and the generated configuration file.

10. A system to generate an email campaign, comprising:
   an email campaign generator that generates an email campaign template from an email target database, wherein said email target database comprises a plurality of email targets; and
   an email campaign engine that generates a custom email corresponding to each of said plurality of email targets, wherein said custom email is formed from said email campaign template, wherein said email campaign engine sends said custom email to each of said plurality of email targets;
   wherein said email campaign template comprises
      a text message, and
      a configuration file that includes data from said email target database corresponding to each of said plurality of email targets.

11. The system of claim 10, wherein said email campaign engine makes a copy of said text message to generate said custom email.

12. The system of claim 11, wherein said email campaign engine replaces at least one custom tag in said text message copy with a corresponding portion of said configuration file data.

13. The system of claim 10, wherein said email campaign generator comprises a custom uniform resource locator generator that creates a custom uniform resource locator address for each of said plurality of email targets, wherein said configuration file includes said custom uniform resource locator address in said data.

14. The system of claim 13, wherein said custom uniform resource locator generator generates a hash from a campaign ID, a message template version ID, a user reference ID, and a private key, for each of said plurality of email targets, and appends at least a portion of the generated hash to a host web address to form said custom uniform resource locator address for each of said plurality of email targets.

15. The system of claim 14, wherein said host web address is equal to:

hostname/module?token where hostname is replaced with an email campaign host Internet address,
   module is replaced with an identifier for software located at the email campaign host directed to processing said custom uniform resource locator address for an email target after it is selected, and
   token is replaced with any alphanumeric identifier for unique information related to said custom uniform resource locator address for said email target.

* * * * *